United States Patent

Ota et al.

[11] Patent Number: 6,011,105
[45] Date of Patent: Jan. 4, 2000

[54] FLAME-RETARDANT SILICON RUBBER COMPOSITION FOR COATING ELECTRICAL WIRE AND CABLE

[75] Inventors: Kenji Ota; Kazuo Hirai, both of Chiba Prefecture, Japan

[73] Assignee: Dow Corning Toray Silicone Co., Ltd., Tokyo, Japan

[21] Appl. No.: 09/138,509

[22] Filed: Aug. 24, 1998

[30] Foreign Application Priority Data

Aug. 27, 1997 [JP] Japan .................................. 9-246069

[51] Int. Cl.⁷ .................................................. C08K 3/40
[52] U.S. Cl. .............................................................. 524/494
[58] Field of Search ............................................ 524/494

[56] References Cited

U.S. PATENT DOCUMENTS

| | | | |
|---|---|---|---|
| 4,260,536 | 4/1981 | Yonezawa et al. | 260/37 |
| 4,275,184 | 6/1981 | Bargain | 528/76 |
| 4,310,444 | 1/1982 | Hamada | 260/18 |
| 4,366,278 | 12/1982 | Hamada | 524/210 |
| 4,743,671 | 5/1988 | Dorn | 528/24 |
| 4,758,647 | 7/1988 | Niwa | 528/24 |
| 5,120,385 | 6/1992 | Takahashi | 156/244.12 |
| 5,160,670 | 11/1992 | Hamada | 264/6 |
| 5,543,450 | 8/1996 | Takita | 524/190 |
| 5,866,653 | 2/1999 | Matsushita | 524/731 |

FOREIGN PATENT DOCUMENTS 18758 of 1984 Japan .
16968 of 1985 Japan .

*Primary Examiner*—Paul R. Michl
*Attorney, Agent, or Firm*—Jennifer S. Warren; William F. Boley

[57] ABSTRACT

The flame-retardant silicone rubber composition for coating electrical wire and cable that comprises
(A) polyorganosiloxane with the average compositional formula $R_a SiO_{(4-a)/2}$ in which R represents substituted and unsubstituted monovalent hydrocarbon groups and a is a number from 1.8 to 2.3;
(B) microparticulate silica having a mean primary particle diameter of at least 18 nm and a specific surface area no greater than 95 $m^2/g$;
(C) platinum or a platinum compound;
(D) triazole compound; and
(E) methyl-substituted benzoyl peroxide.

10 Claims, No Drawings

FLAME-RETARDANT SILICON RUBBER COMPOSITION FOR COATING ELECTRICAL WIRE AND CABLE

FIELD OF THE INVENTION

This invention is a flame-retardant silicone rubber compositions for coating electrical wire and cable, abbreviated below as flame-retardant EWC silicone rubber compositions. More particularly, this invention relates to a flame-retardant EWC silicone rubber composition that can be used with glass cloth-encased wire and cable in which the glass cloth element has been impregnated with, for example, an acrylic, polyester, or silicone varnish, and which can also be used with wire and cable not encased with glass cloth.

BACKGROUND OF THE INVENTION

Silicone rubbers find frequent use as coatings for electrical wire and cable as consequence of their excellent heat resistance, excellent cold resistance, excellent resistance to aging, excellent electrical properties, and the like. 2,4-Dichlorobenzoyl peroxide has in the past been employed as a curing agent for effecting cure of the silicone rubber compositions employed as cable and wire coatings. However, silicone rubber compositions containing this organoperoxide have been associated with a number of problems, i.e., the generation of unpleasant odor during cure, the generation of stickiness, or tack on the molding surface post-cure, and blooming onto the surface of the silicone rubber molding post-cure. Blooming is the gradual outmigration of degradation products originating from the curing agent and presents as a whitening of the molding surface. A great deal of research has been performed to date in order to solve these problems. For example, Japanese Patent Application Laid Open (Kokai or Unexamined) Number Sho 54-48870 (48,870/1979) teaches a method for preparing low-surface-tack silicone rubber moldings through the use of bis(2,4-dichlorobenzoyl)peroxide and di-tert-butyl peroxide as the curing agent. However, this method is not fully satisfactory because it does not completely suppress tack on the molding surface or the unpleasant odor generated during cure. Japanese Patent Application Laid Open (Kokai or Unexamined) Number Sho 59-18758 (18,758/1984) teaches a method that uses bis(ortho-methylbenzoyl)peroxide as the silicone rubber composition curing agent. Neither the above-described blooming nor unpleasant odor generation occur with this method. In addition, Japanese Patent Application Laid Open (Kokai or Unexamined) Number Sho 62-185750 (185,750/1987) proposes a method that solves the above-described problems through the use of bis(para-methylbenzoyl)peroxide as the silicone rubber composition curing agent. However, the silicone rubber moldings produced by the thermosetting of a silicone rubber composition prepared according to the former method (use of bis(ortho-methylbenzoyl)peroxide) have a yellowish tint (yellowing), while the silicone rubber composition prepared according to the latter method (use of bis(para-methylbenzoyl)peroxide) suffers from a slow cure rate and a pronounced tendency to foam during curing with the production of microscopic bubbles (voids).

In particular, a fatal drawback of the above-described silicone rubber compositions that use methyl-substituted benzoyl peroxide as curing agent is that they afford silicone rubber coatings with a substantially diminished flame resistance. The object of the present invention is to provide an EWC silicone rubber composition and in particular to provide a highly flame-retardant EWC silicone rubber composition.

DETAILED DESCRIPTION OF THE INVENTION

The present invention is a flame-retardant silicone rubber composition for coating electrical wire and cable, that comprises (A) 100 weight parts polyorganosiloxane with the average compositional formula $R_aSiO_{(4-a)/2}$ in which R represents substituted and unsubstituted monovalent hydrocarbon groups and a is a number from 1.8 to 2.3;

(B) 10 to 100 weight parts microparticulate silica having a mean primary particle diameter of at least 18 nm and a specific surface area no greater than 95 $m^2/g$;

(C) platinum or a platinum compound in a quantity that provides from 1 to 1,000 weight parts as platinum metal for each 1,000,000 weight parts component (A);

(D) 0.01 to 10 weight parts triazole compound; and (E) 0.05 to 10 weight parts methyl-substituted benzoyl peroxide.

Because the flame-retardant EWC silicone rubber composition according to the present invention comprises components (A) through (E) and in particular because it contains components (C), (D), and (E), this composition is characterized by freedom from such problems as elaboration of unpleasant odor and post-cure blooming and in particular is characterized by its ability to afford a cable and wire coating material with an excellent flame resistance.

The polyorganosiloxane (A) used in the present invention is the base component of the subject composition and is represented by the average compositional formula $R_aSiO_{(4-a)/2}$ in which R denotes substituted and unsubstituted monovalent hydrocarbon groups. R is exemplified by alkyl groups such as methyl, ethyl, propyl; alkenyl groups such as vinyl, allyl, butenyl, hexenyl; aryl groups such as phenyl; 3,3,3-trifluoropropyl; 2-phenylethyl; and 2-cyanoethyl. The subscript a is a number from 1.8 to 2.3. The molecular structure of this component can be straight chain or partially branched straight chain. Usable degrees of polymerization for this component will be within the range associated with polyorganosiloxanes in the art. In general, a component (A) will be used that has a viscosity at 25° C. of at least $1 \times 10^7$ mPa.s and an average molecular weight of at least $25 \times 10^4$.

The microparticulate silica (B) is an essential component that imparts both flame resistance as well as an excellent mechanical strength to the silicone rubber moldings afforded by the cure of the composition according to the present invention. Dry-process silicas such as fumed silica are suitable for use as the subject microparticulate silica. Also useable are the microparticulate silicas afforded by hydrophobicizing the surface of the aforementioned silicas by treatment with an organosilicon compound such as organosilane, organosilazane, polyorganosiloxane, or diorganocyclopolysiloxane. This component must have a mean primary particle diameter of at least 18 nm and a specific surface no greater than 95 $m^2/g$. The mean primary particle diameter is preferably from 18 nm (inclusive) to 50 nm (inclusive) and the specific surface is preferably from 30 $m^2/g$ (inclusive) to 95 $m^2/g$ (inclusive). This component is added at from 10 to 100 weight parts per 100 weight parts component (A). The use of less than 10 weight parts leads to a reduced mechanical strength after vulcanization of the composition according to the present invention, while blending into component (A) becomes highly problematic at more than 100 weight parts.

The platinum or platinum compound (C) is exemplified by microparticulate platinum, platinum black, chloroplatinic acid, chloroplatinic acid-olefin complexes, chloroplatinic acid-tetramethyldivinylsiloxane complexes, and platinum-diketone complexes. This component is added at from 1 to 1,000 weight parts and preferably at from 1 to 100 weight parts, in each case as platinum per 1,000,000 weight parts component (A).

The triazole compound (D) includes benzotriazole, 1,2, 3-triazole, 1,2,4-triazole, and their derivatives. Specific examples are benzotriazole, 1-methylbenzotriazole, 5,6-dimethylbenzotriazole, 2-phenylbenzotriazole, 1-methyl-1, 2,3-triazole, 1-phenyl-1,2,3-triazole, 4-methyl-2-phenyl-1, 2,3-triazole, 1-methyl-1,2,4-triazole, and 1,3-diphenyl-1,2, 4-triazole. This triazole compound is added at from 0.01 to 10 weight parts per 100 weight parts component (A).

The methyl-substituted benzoyl peroxide (E) is exemplified by monomethylbenzoyl peroxides, dimethylbenzoyl peroxides, and trimethylbenzoyl peroxides. Specific examples are bis(ortho-methylbenzoyl)peroxide, bis(m-methylbenzoyl)peroxide, bis(para-methylbenzoyl)peroxide, 2,3,4-trimethylbenzoyl peroxide, 2,4-dimethylbenzoyl peroxide, 2,6-dimethylbenzoyl peroxide, 2,3,4-trimethylbenzoyl peroxide, 2,4,6-trimethylbenzoyl peroxide, and the like. Particularly preferred from the standpoint of price and performance are bis(ortho-methylbenzoyl)peroxide, bis(m-methylbenzoyl)peroxide, bis(para-methylbenzoyl)peroxide, and 2,6-dimethylbenzoyl peroxide. This methyl-substituted benzoyl peroxide (E) is known (refer to Japanese Patent Publication (Kokoku) Number Hei 3-54138 (54,138/1991)) and is commercially available. This component is added at from 0.05 to 10 weight parts and preferably at from 0.1 to 5 weight parts, in each case per 100 weight parts polyorganosiloxane (A).

The composition according to the present invention comprises the components (A) through (E) as described above, but in addition to components (A) through (E) this composition may as necessary contain silanol-endblocked polydiorganosiloxane, organosilane, or organosilazane as a plasticization reversion inhibitor. Silica micropowder other than component (B) may also be added insofar as the object of the present invention is not impaired. Moreover, the various additives heretofore known for use in silicone rubber compositions may be added, again insofar as the object of the present invention is not impaired. These additives are exemplified by flame retardants such as diatomaceous earth, quartz powder, calcium carbonate, zinc carbonate, titanium dioxide, γ-ferric oxide, triiron tetroxide, aluminum oxide, aluminum hydroxide, carbon black, and the like; heat stabilizers such as cerium silanolate, the cerium salts of fatty acids, and the like; release agents such as fatty acids and their metal salts, for example, stearic acid, zinc stearate, and calcium stearate; and pigments such as iron oxide red.

The composition according to the present invention can be prepared simply by mixing components (A) to (E) to homogeneity in their prescribed quantities. In a preferred preparative method, however, components (A) and (B) are first mixed, preferably with heating, to prepare a silicone rubber base compound, and components (C) and (D) or (C), (D), and (E) are subsequently mixed into the silicone rubber base compound. The heretofore known mixers, e.g., a kneader mixer, twin-screw continuous compounding extruder, etc., can be used to mix components (A) and (B) to give the silicone rubber base compound. A mixer such as a two-roll mill, kneader mixer, etc., can be used as the means for mixing components (C), (D), and (E).

Silicone rubber-coated electrical wire and cable can be fabricated according to the present invention by coating the metal conductor core with the herein described silicone rubber composition and then curing the silicone rubber composition with the application of heat. The heretofore known techniques can be used to coat the silicone rubber composition on the conductor core, for example, the conductor core can be coated with the silicone rubber composition as the composition is being extruded from an extruder and the silicone rubber composition can then be immediately cured in a forced convection oven, or the conductor core and silicone rubber composition can be introduced into a mold and thermosetting can then be carried out using a press.

The composition according to the present invention as described above exhibits an excellent flame resistance notwithstanding its use of methyl-substituted benzoyl peroxide to effect cure. This flame resistance is unrelated to the presence or absence of wrapping with glass cloth and the like, and can pass the UL758 test.

EXAMPLES

The present invention will be explained below using working and comparative examples. In the examples "parts" denotes "weight parts". The conditions used to fabricate the cable and the method used in the examples to measure the cable's flame resistance are reported below.

Cable Fabrication Conditions

A conductor core (tin-plated soft copper cable) with an outside diameter of 1.0 mm (20 count/0.18 mm) was coated by extruding the silicone rubber composition at a thickness of 0.8 mm. This silicone rubber composition-coated cable was heated for 18 seconds in a 400° C. forced convection oven to produce a silicone rubber-coated cable, which was tested as the "unwrapped cable".

In addition, a wrapped cable was fabricated by covering the above-described silicone rubber-coated cable with a 2.7 mm-diameter glass sleeve, impregnating with a silicone varnish, and heating for 10 minutes in a 150° C. oven. This was tested as the "wrapped cable".

Measurement of Flame Resistance

The evaluation measured the number of seconds of combustion according to the method described in UL758. Each test specimen was brought into contact with the flame 5 times and the number of seconds was measured for each pass. This procedure was run on 5 test specimens. The maximum seconds of combustion and the average seconds of combustion for each pass were calculated based on the measurement results for the 5 test specimens. The specimen passed if the maximum seconds of combustion and the average seconds of combustion were both 60 seconds or less. Those specimens that burned up to the very top were termed "consumed". A score of "present" was assigned in the dripping category when flame was observed to drip off during combustion.

Example 1

100 parts dimethylvinylsiloxy-endblocked polydiorganosiloxane (degree of polymerization=5,000, 99.6 mole % dimethylsiloxane unit, 0.4 mole % methylvinylsiloxane unit), 2.7 parts silanol-endblocked dimethylpolysiloxane (viscosity=60 mPa.s at 25° C.), and 50 parts dry-process silica with a mean primary particle diameter of 30 nm and a specific surface of 50 m$^2$/g were introduced into a kneader mixer and mixed to homogeneity while heating. Next, a silicone rubber compound (silicone rubber compound I) was prepared by mixing the following to homogeneity into 100 parts of the preceding mixture using a two-roll mill: 0.3 part 1 weight % isopropanolic chloroplatinic acid solution, 0.1 part benzotriazole, and 1.5 parts of a 50 weight % silicone oil paste of bis(para-methylbenzoyl)peroxide. Flame-retardant EWC silicone rubber compositions were prepared by mixing silicone rubber compound I to homogeneity with quartz powder, fumed titanium dioxide powder, zinc carbonate powder, or carbon black in the quantities reported in Table 1. These compositions were used as described above to produce silicone rubber-coated cables, which were measured for flame resistance according to the UL758 method. The results of these measurements are reported in Table 1.

TABLE 1

| Test No. | 1 | 2 | 3 | 4 | 5 |
|---|---|---|---|---|---|
| silicone rubber compound I (parts) | 100 | 100 | 100 | 100 | 100 |
| quartz powder (parts) | — | 5 | — | — | — |
| fumed titanium dioxide powder (parts) | — | — | 5 | — | — |
| zinc carbonate powder (parts) | — | — | — | 5 | — |
| carbon black (parts) | — | — | — | — | 1 |
| combustion times for the unwrapped cable (seconds) | | | | | |
| 1st pass (max/avg) | 34/28 | 20/16 | 14/13 | 26/23 | 30/27 |
| 2nd pass (max/avg) | 28/21 | 16/9 | 11/4 | 13/10 | 16/7 |
| 3rd pass (max/avg) | 15/7 | 3/2 | 2/2 | 3/2 | 11/7 |
| 4th pass (max/avg) | 2/2 | 2/1 | 0/0 | 3/2 | 0/0 |
| 5th pass (max/avg) | 1/1 | 2/1 | 0/0 | 0/0 | 0/0 |
| presence/absence of dripping | absent | absent | absent | absent | absent |
| combustion times for the wrapped cable (seconds) | | | | | |
| 1st pass (max/avg) | 31/27 | 28/21 | 20/17 | 26/21 | 27/25 |
| 2nd pass (max/avg) | 27/26 | 23/10 | 12/9 | 18/15 | 19/14 |
| 3rd pass (max/avg) | 15/13 | 11/7 | 10/5 | 15/7 | 8/7 |
| 4th pass (max/avg) | 10/5 | 7/4 | 4/2 | 4/2 | 6/4 |
| 5th pass (max/avg) | 2/1 | 3/1 | 0/0 | 0/0 | 0/0 |
| presence/absence of dripping | absent | absent | absent | absent | absent |

Example 2

A silicone rubber compound (silicone rubber compound II) was produced as in Example 1, but in this case using 4.5 parts of the silanol-endblocked dimethylpolysiloxane (viscosity=60 centistokes at 25° C.) and 35 parts dry-process silica with a mean primary particle diameter of 30 nm and a specific surface of 50 m²/g and 15 parts dry-process silica with a mean primary particle diameter of 16 nm and a specific surface of 130 m²/g. Flame-retardant EWC silicone rubber compositions were prepared by mixing the obtained silicone rubber compound II to homogeneity with quartz powder, fumed titanium dioxide powder, zinc carbonate powder, or carbon black in the quantities reported in Table 2. These compositions were used as described above to produce silicone rubber-coated cables, which were measured for flame resistance as in Example 1. The results of these measurements are reported in Table 2.

TABLE 2

| Test No. | 6 | 7 | 8 | 9 | 10 |
|---|---|---|---|---|---|
| silicone rubber compound II (parts) | 100 | 100 | 100 | 100 | 100 |
| quartz powder (parts) | — | 5 | — | — | — |
| fumed titanium dioxide powder (parts) | — | — | 5 | — | — |
| zinc carbonate powder (parts) | — | — | — | 5 | — |
| carbon black (parts) | — | — | — | — | 1 |
| combustion times for the unwrapped cable (seconds) | | | | | |
| 1st pass (max/avg) | 51/44 | 41/38 | 38/29 | 45/37 | 36/33 |
| 2nd pass (max/avg) | 34/25 | 26/19 | 19/14 | 16/12 | 23/19 |
| 3rd pass (max/avg) | 11/8 | 12/10 | 8/6 | 10/7 | 15/8 |
| 4th pass (max/avg) | 6/5 | 3/1 | 5/3 | 8/7 | 9/3 |
| 5th pass (max/avg) | 4/1 | 5/1 | 0/0 | 3/1 | 0/0 |
| presence/absence of dripping | absent | absent | absent | absent | absent |
| combustion times for the wrapped cable (seconds) | | | | | |
| 1st pass (max/avg) | 47/43 | 46/35 | 34/29 | 33/27 | 38/31 |
| 2nd pass (max/avg) | 23/16 | 23/20 | 19/14 | 25/19 | 19/15 |
| 3rd pass (max/avg) | 15/8 | 11/8 | 15/7 | 15/11 | 13/10 |
| 4th pass (max/avg) | 8/6 | 7/4 | 10/3 | 6/5 | 9/3 |
| 5th pass (max/avg) | 0/0 | 3/1 | 0/0 | 2/1 | 0/0 |
| presence/absence of dripping | absent | absent | absent | absent | absent |

Comparative Example 1

A silicone rubber compound (silicone rubber compound III) was produced as in Example 1, but in this case omitting the 0.3 part 1 weight % isopropanolic chloroplatinic acid that was used in Example 1. Flame-retardant EWC silicone rubber compositions were prepared by mixing the obtained silicone rubber compound III to homogeneity with quartz powder, fumed titanium dioxide powder, zinc carbonate powder, or carbon black in the quantities reported in Table 3. These compositions were used as described above to produce silicone rubber-coated cables, which were measured for flame resistance as in Example 1. The results of these measurements are reported in Table 3.

TABLE 3

| Test No. | 11 | 12 | 13 | 14 | 15 |
|---|---|---|---|---|---|
| silicone rubber compound III (parts) | 100 | 100 | 100 | 100 | 100 |
| quartz powder (parts) | — | 5 | — | — | — |
| fumed titanium dioxide powder (parts) | — | — | 5 | — | — |
| zinc carbonate powder (parts) | — | — | — | 5 | — |
| carbon black (parts) | — | — | — | — | 1 |
| combustion times for the unwrapped cable (seconds) | | | | | |
| 1st pass (max/avg) | consumed | consumed | consumed | consumed | consumed |
| 2nd pass (max/avg) | 0/0 | 0/0 | 0/0 | 0/0 | 0/0 |
| 3rd pass (max/avg) | 0/0 | 0/0 | 0/0 | 0/0 | 0/0 |
| 4th pass (max/avg) | 0/0 | 0/0 | 0/0 | 0/0 | 0/0 |
| 5th pass (max/avg) | 0/0 | 0/0 | 0/0 | 0/0 | 0/0 |
| presence/absence of dripping | absent | absent | absent | absent | absent |
| combustion times for the wrapped cable (seconds) | | | | | |
| 1st pass (max/avg) | consumed | consumed | consumed | consumed | consumed |

TABLE 3-continued

| Test No. | 11 | 12 | 13 | 14 | 15 |
|---|---|---|---|---|---|
| 2nd pass (max/avg) | 0/0 | 0/0 | 0/0 | 0/0 | 0/0 |
| 3rd pass (max/avg) | 0/0 | 0/0 | 0/0 | 0/0 | 0/0 |
| 4th pass (max/avg) | 0/0 | 0/0 | 0/0 | 0/0 | 0/0 |
| 5th pass (max/avg) | 0/0 | 0/0 | 0/0 | 0/0 | 0/0 |
| presence/absence of dripping | absent | absent | absent | absent | absent |

Comparative Example 2

A silicone rubber compound (silicone rubber compound IV) was produced as in Example 1, but in this case omitting the 0.1 part benzotriazole that was used in Example 1. Flame-retardant EWC silicone rubber compositions were prepared by mixing the obtained silicone rubber compound IV to homogeneity with quartz powder, fumed titanium dioxide powder, zinc carbonate powder, or carbon black in the quantities reported in Table 4. These compositions were used as described above to produce silicone rubber-coated cables, which were measured for flame resistance as in Example 1. The results of these measurements are reported in Table 4.

TABLE 4

| Test No. | 16 | 17 | 18 | 19 | 20 |
|---|---|---|---|---|---|
| silicone rubber compound IV (parts) | 100 | 100 | 100 | 100 | 100 |
| quartz powder (parts) | — | 5 | — | — | — |
| fumed titanium dioxide powder (parts) | — | — | 5 | — | — |
| zinc carbonate powder (parts) | — | — | — | 5 | — |
| carbon black (parts) | — | — | — | — | 1 |
| combustion times for the unwrapped cable (seconds) | | | | | |
| 1st pass (max/avg) | con-sumed | con-sumed | 64/42 | 76/53 | 87/56 |
| 2nd pass (max/avg) | 0/0 | 0/0 | 5/2 | 6/3 | 12/5 |
| 3rd pass (max/avg) | 0/0 | 0/0 | 4/2 | 4/2 | 5/1 |
| 4th pass (max/avg) | 0/0 | 0/0 | 2/1 | 2/1 | 0/0 |
| 5th pass (max/avg) | 0/0 | 0/0 | 1/1 | 2/1 | 0/0 |
| presence/absence of dripping | present | present | present | present | present |
| combustion times for the wrapped cable (seconds) | | | | | |
| 1st pass (max/avg) | con-sumed | con-sumed | 64/49 | 97/57 | 77/54 |
| 2nd pass (max/avg) | 0/0 | 0/0 | 5/3 | 4/2 | 3/1 |
| 3rd pass (max/avg) | 0/0 | 0/0 | 9/2 | 6/2 | 1/0 |
| 4th pass (max/avg) | 0/0 | 0/0 | 2/1 | 8/2 | 0/0 |
| 5th pass (max/avg) | 0/0 | 0/0 | 2/1 | 2/1 | 0/0 |
| presence/absence of dripping | present | present | present | present | present |

Comparative Example 3

A silicone rubber compound (silicone rubber compound V) was produced as in Example 1, but in this case using 10 parts of the silanol-endblocked dimethylpolysiloxane (viscosity=60 centistokes at 25° C.) that was used in Example 1 and using 50 parts of a dry-process silica with a mean primary particle diameter of 16 nm and a specific surface of 130 m²/g. Flame-retardant EWC silicone rubber compositions were prepared by mixing the obtained silicone rubber compound V to homogeneity with quartz powder, fumed titanium dioxide powder, zinc carbonate powder, or carbon black in the quantities reported in Table 5. These compositions were used as described above to produce silicone rubber-coated cables, which were measured for flame resistance as in Example 1. The results of these measurements are reported in Table 5.

TABLE 5

| Test No. | 21 | 22 | 23 | 24 | 25 |
|---|---|---|---|---|---|
| silicone rubber compound V (parts) | 100 | 100 | 100 | 100 | 100 |
| quartz powder (parts) | — | 5 | — | — | — |
| fumed titanium dioxide powder (parts) | — | — | 5 | — | — |
| zinc carbonate powder (parts) | — | — | — | 5 | — |
| carbon black (parts) | — | — | — | — | 1 |
| combustion times for the unwrapped cable (seconds) | | | | | |
| 1st pass (max/avg) | con-sumed | con-sumed | con-sumed | con-sumed | con-sumed |
| 2nd pass (max/avg) | 0/0 | 0/0 | 0/0 | 0/0 | 0/0 |
| 3rd pass (max/avg) | 0/0 | 0/0 | 0/0 | 0/0 | 0/0 |
| 4th pass (max/avg) | 0/0 | 0/0 | 0/0 | 0/0 | 0/0 |
| 5th pass (max/avg) | 0/0 | 0/0 | 0/0 | 0/0 | 0/0 |
| presence/absence of dripping | present | present | absent | present | absent |
| combustion times for the wrapped cable (seconds) | | | | | |
| 1st pass (max/avg) | con-sumed | con-sumed | con-sumed | con-sumed | con-sumed |
| 2nd pass (max/avg) | 0/0 | 0/0 | 0/0 | 0/0 | 0/0 |
| 3rd pass (max/avg) | 0/0 | 0/0 | 0/0 | 0/0 | 0/0 |
| 4th pass (max/avg) | 0/0 | 0/0 | 0/0 | 0/0 | 0/0 |
| 5th pass (max/avg) | 0/0 | 0/0 | 0/0 | 0/0 | 0/0 |
| presence/absence of dripping | present | present | absent | present | absent |

We claim:

1. Flame-retardant silicone rubber composition for coating electrical wire and cable, comprising:

(A) 100 weight parts polyorganosiloxane with the average compositional formula $R_a SiO_{(4-a)/2}$ in which R represents substituted and unsubstituted monovalent hydrocarbon groups and a is a number from 1.8 to 2.3;

(B) 10 to 100 weight parts microparticulate silica having a mean primary particle diameter of at least 18 nm and a specific surface area no greater than 95 m²/g;

(C) platinum or a platinum compound in a quantity that provides from[1] to 1,000 weight parts as platinum metal for each 1,000,000 weight parts component (A);

(D) 0.01 to 10 weight parts triazole compound; and (E) 0.05 to 10 weight parts methyl-substituted benzoyl peroxide.

2. The composition according to claim 1 where the polyorganosiloxane is a polydimethylsiloxane having a viscosity greater than about $1 \times 10^7$ mPa.s.

3. The composition of claim 1 where the mircoparticulate silica has a specific surface from about 30 m²/g to about 95 m²/g.

4. The composition of claim 1 where the platinum or platinum compound is added at from 1 to 100 weight parts as platinum per 1,000,000 weight parts component A.

5. The composition of claim 1 where the triazole compound is selected from the group consisting of benzotriazole, 1-methylbenzotriazole, 5,6- dimethylbenzotriazole, 2-phenylbenzotriazole, 1-methl-1,2, 3-triazole, 1-phenyl-1,2,3-triazole, 4-methyl-2-phenyl 1,2,3-trialzole, 1-methyl-1,2,4-triazole, and 1,3-diphenyl-1,2,3-triazole.

6. The composition of claim 1 where the methyl-substituted benzoyl peroxide is selected from the group consisting of bis(ortho-methylbenzoyl)peroxide, bis(m-methylbenzoyl)peroxide, bis(para-methylbenzoyl)peroxide, 2,3-dimethylbenzoyl peroxide, 2,4-dimethylbenzoyl peroxide, 2,6-dimethylbenzoyl peroxide, 2,3,4-trimethylbenzoyl peroxide, and 2,4,6-trimethylbenzoyl peroxide.

7. The composition of claim 1 where the methyl-substituted benzoyl peroxide is selected from the group consisting of bis(ortho-methylbenzoyl)peroxide, bis(m-methylbenzoyl)peroxide, bis(para-methylbenzoyl)peroxide, and 2,6-dimethylbenzoyl peroxide.

8. The composition of claim 1 where the methyl-substituted benzoyl peroxide is added at from 1 to 5 weight parts per 100 weight parts of the polyorganosiloxane.

9. A method of making a flame-retardant silicone rubber composition for coating electrical wire and cable, comprising the steps of
(I) first mixing
   (A) 100 weight parts polyorganosiloxane with the average compositional formula $R_aSiO_{(4-a)/2}$ in which R represents substituted and unsubstituted monovalent hydrocarbon groups and a is a number from 1.8 to 2.3; and
   (B) 10 to 100 weight parts microparticulate silica having a mean primary particle diameter of at least 18 nm and a specific surface area no greater than 95 $m^2/g$;

to provide a base compound, and then
(II) adding
   (C) platinum or a platinum compound in a quantity that provides from 1 to 1,000 weight parts as platinum metal for each 1,000,000 weight parts component (A);
   (D) 0.01 to 10 weight parts triazole compound; and
   (E) 0.05 to 10 weight parts methyl-substituted benzoyl peroxide.

10. A wire coated with a flame-retardant silicone rubber composition comprising:

(A) 100 weight parts polyorganosiloxane with the average compositional formula $R_aSiO_{(4-a)/2}$ in which R represents substituted and unsubstituted monovalent hydrocarbon groups and a is a number from 1.8 to 2.3;

(B) 10 to 100 weight parts microparticulate silica having a mean primary particle diameter of at least 18 nm and a specific surface area no greater than 95 $m^2/g$;

(C) platinum or a platinum compound in a quantity that provides from 1 to 1,000 weight parts as platinum metal for each 1,000,000 weight parts component (A);

(D) 0.01 to 10 weight parts triazole compound; and (E) 0.05 to 10 weight parts methyl-substituted benzoyl peroxide.

* * * * *